No. 690,587. Patented Jan. 7, 1902.
J. H. KESSLER.
THILL SUPPORT.
(Application filed Oct. 31, 1901.)
(No Model.) 3 Sheets—Sheet 1.

Witnesses John H. Kessler
Inventor
by
Attorney

THE NORRIS PETERS CO., PHOTO-LITHO., WASHINGTON, D. C.

No. 690,587. Patented Jan. 7, 1902.
J. H. KESSLER.
THILL SUPPORT.
(Application filed Oct. 31, 1901.)
(No Model.) 3 Sheets—Sheet 2.
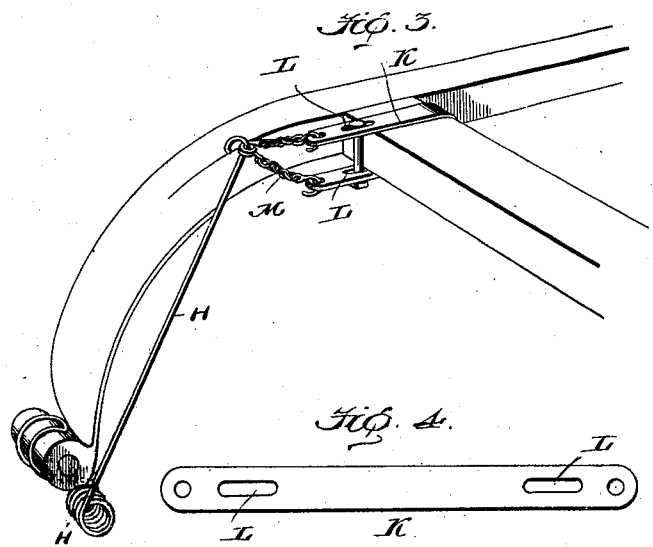
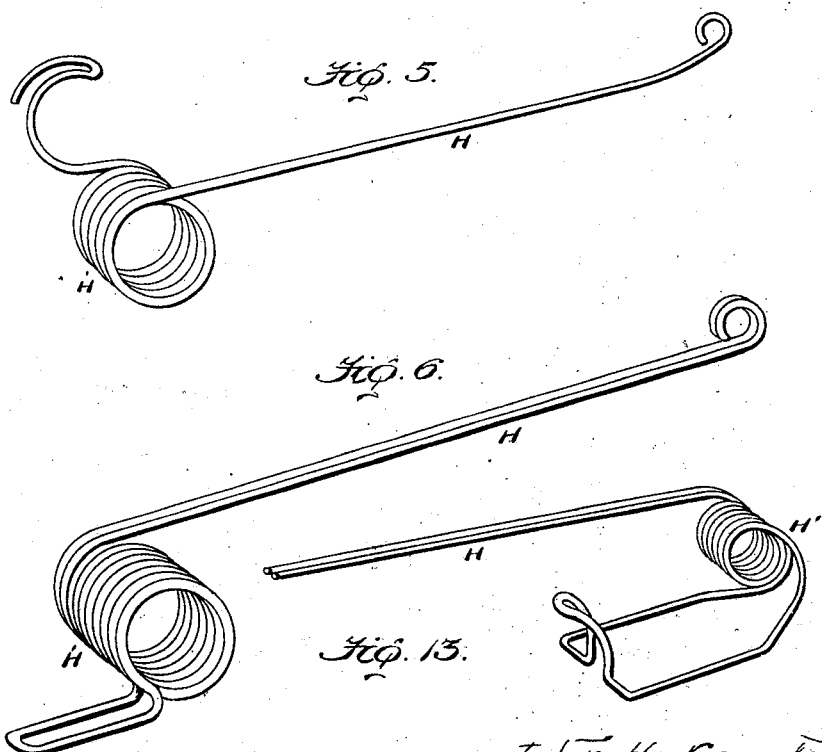

No. 690,587. Patented Jan. 7, 1902.
J. H. KESSLER.
THILL SUPPORT.
(Application filed Oct. 31, 1901.)
(No Model.) 3 Sheets—Sheet 3.
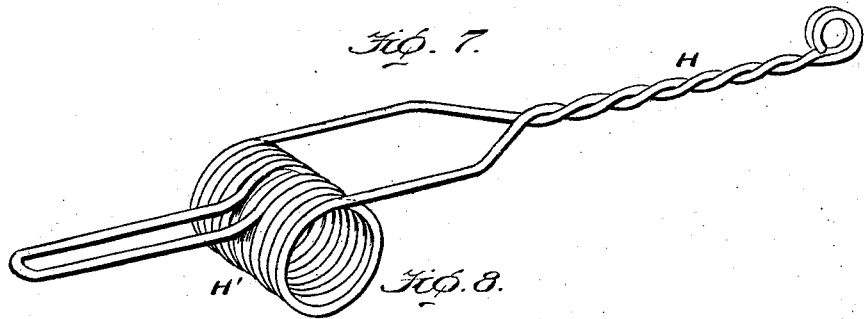
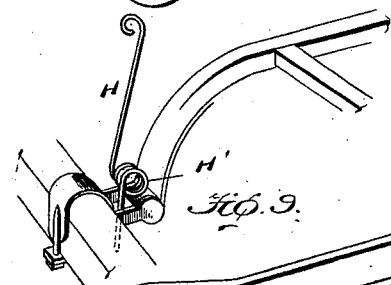
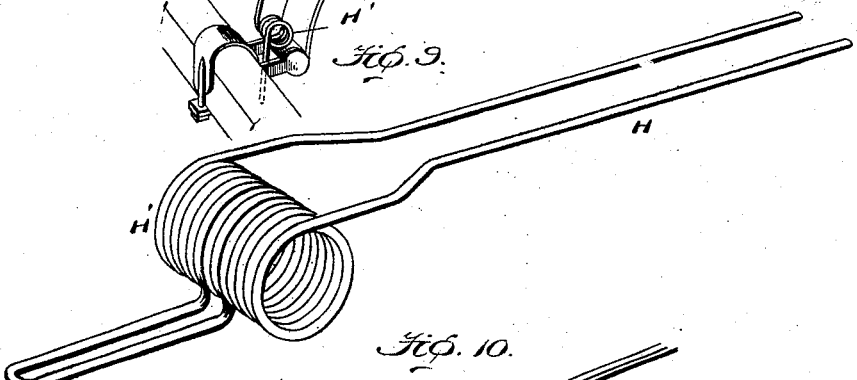
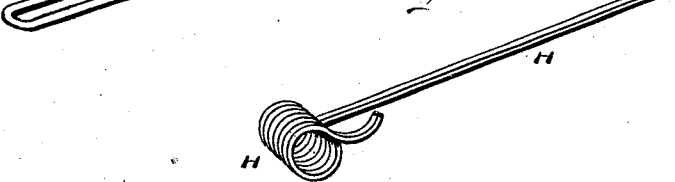
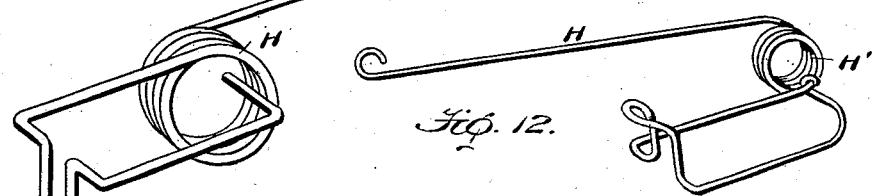
Witnesses John H. Kessler
Inventor
by
Attorney
THE NORRIS PETERS CO., PHOTO-LITHO., WASHINGTON, D. C.

UNITED STATES PATENT OFFICE.

JOHN H. KESSLER, OF SYRACUSE, NEW YORK.

THILL-SUPPORT.

SPECIFICATION forming part of Letters Patent No. 690,587, dated January 7, 1902.

Application filed October 31, 1901. Serial No. 80,636. (No model.)

*To all whom it may concern:*

Be it known that I, JOHN H. KESSLER, a citizen of the United States, residing at Syracuse, in the county of Onondaga and State of New York, have invented certain new and useful Improvements in Thill-Supports, of which the following is a specification.

My invention relates to improvements in thill-supports; and the object of my invention is the provision of a device of inexpensive construction which can be readily and easily applied and which will support the thills at any desired height and which will effectually prevent any rattling of the coupling, and thus insure a useful and practical device for the desired purpose.

With this object in view my invention consists of a thill-support embodying novel features of construction and combination of parts, substantially as disclosed herein.

Figure 1:
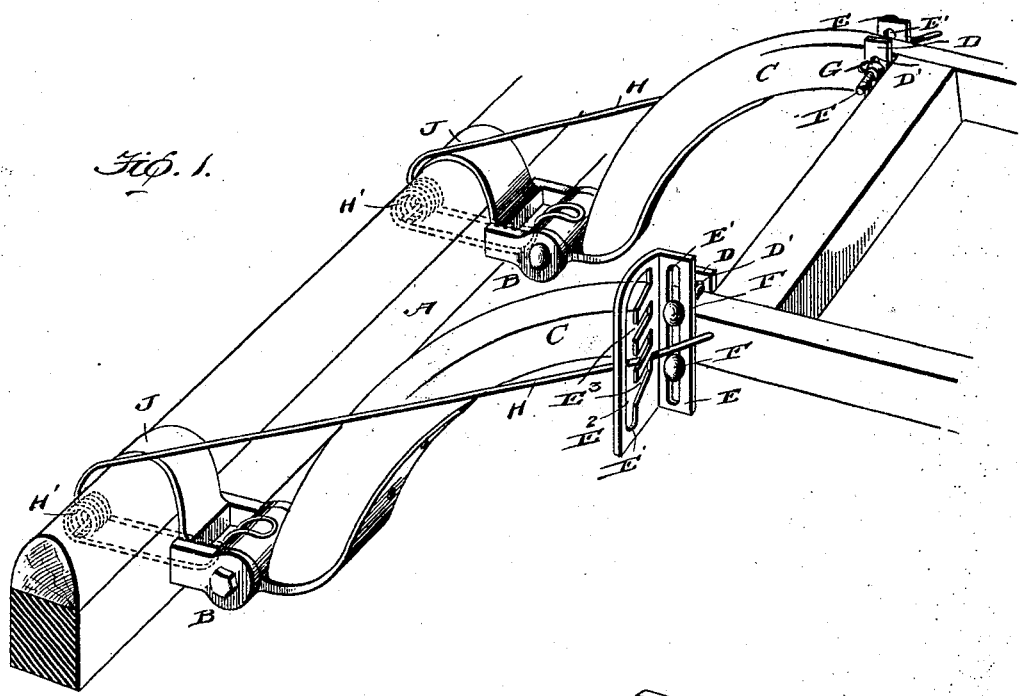
Figure 2:
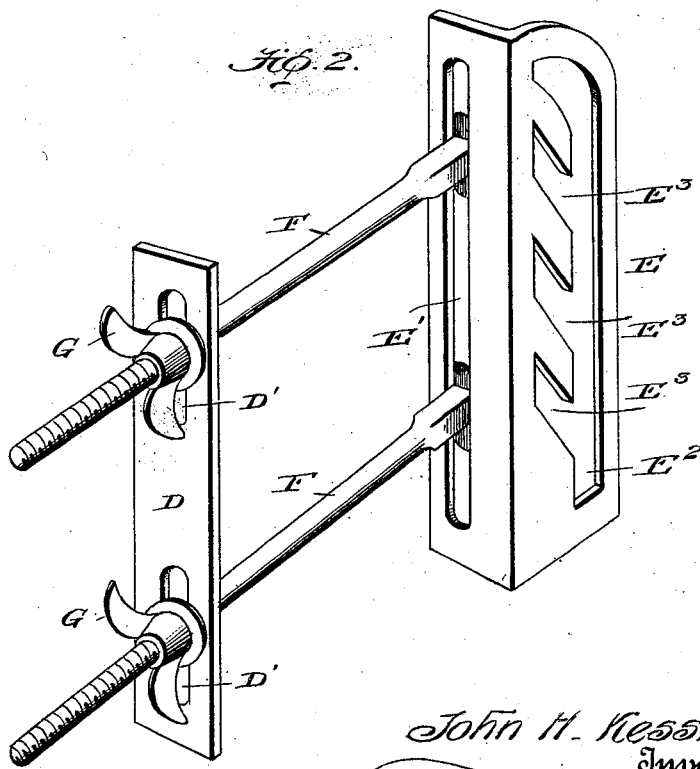

Figure 1 represents a perspective view of my complete thill-support applied in operative position. Fig. 2 represents an enlarged perspective view of the tension or adjusting device employed in my support. Figs. 3 and 4 represent detail views of a modified form of my thill-support. Figs. 5, 6, 7, 8, 9, 10, 11, 12, and 13 represent detail perspective views of various forms of springs which may be used upon my thill-support.

In the drawings, A designates a vehicle-axle, B the thill-couplings, and C the thills or shafts, these being shown to more clearly illustrate the application of my invention.

My invention consists of the flat plates D, formed with elongated bolt-openings D', and of the oppositely-arranged angle-plates E, having the horizontal wall formed with a bolt-receiving slot E' and the transverse wall formed with a slot E² and a series of kerfs or recesses E³, the purpose of which will appear. The flat plates and the angle-plates are secured upon the thills adjacent to the cross-bar by means of the bolts F, having the winged adjusting-nuts G. From this construction it will be seen that the plates are secured in pairs upon each side of the thills and that the same may be adjusted vertically, and arranged in any one of the recesses of the angle-plates are the spring-arms H, leading from the coils H', which coils are arranged adjacent to the thill-couplings and have their other ends H² secured by the usual axle-clips J, as clearly shown in Fig. 1. My spring is made in various shapes, as shown in Figs. 5, 6, 7, 8, and 9, but the action is the same in each spring. In the form of my invention shown in Figs. 3 and 4 I employ a staple-shaped bar K, formed with slots L, and to the bars I connect the holding-chain M.

The operation of my device will be readily understood from the description and drawings, and it will be seen that the thills can be raised very high to hold the shafts out of the way when the vehicle is housed or the springs may be adjusted to hold the shafts at the proper place to relieve the animal of their weight, and also that the device can be applied to any form of shafts and will always perform its functions in a perfect manner. It will also be understood that my device will prevent rattling of the couplings, and by reason of its effectiveness, its simplicity and cheapness, and its ornamental appearance it will commend itself as practical and desirable.

I claim—

1. In a thill-support the combination with the axle and thills, a pair of springs connected to the coupling and formed with spring-arms, and a device connected to the thills and adapted to receive the said spring-arms and secure the free ends of said spring-arms at various vertical adjustments, to hold the thills at any desired angle.

2. In a thill-support, the combination with the thills, the plates formed with a series of recesses and connected to the thills, and the coil-springs having the spring-arms the free outer ends of which are adapted to engage the recesses of said plates to support the thills at any desired height or angle.

3. In a thill-support and in combination with the thills, the flat plates having elongated bolt-openings, the angle-plates having the slots to receive the bolts, and the recesses to receive the spring thill-supporting arms.

4. The combination of the thills and coupling, the plates connected to the thills, one being angled and having a series of recesses, and a pair of springs connected to the coupling to form an antirattler and having their free ends constructed to engage any of the recesses of the angled plates to adjustably support the thills.

In testimony whereof I affix my signature in presence of two witnesses.

JOHN H. KESSLER.

Witnesses:
THOS. W. DIXSON,
HENRY D. COVILLE.